(12) United States Patent
Wang et al.

(10) Patent No.: US 7,161,957 B2
(45) Date of Patent: Jan. 9, 2007

(54) VIDEO PACKETS OVER A WIRELESS LINK UNDER VARYING DELAY AND BANDWIDTH CONDITIONS

(75) Inventors: Charles Chuanming Wang, Jamison, PA (US); Shaily Verma, Monmouth Junction, NJ (US)

(73) Assignee: Thomson Licensing, Boulogne (FR)

( * ) Notice: Subject to any disclaimer, the term of this patent is extended or adjusted under 35 U.S.C. 154(b) by 225 days.

(21) Appl. No.: 10/361,396

(22) Filed: Feb. 10, 2003

(65) Prior Publication Data
US 2004/0156354 A1   Aug. 12, 2004

(51) Int. Cl.
*H04J 3/16*   (2006.01)
*H04J 3/22*   (2006.01)
*G06K 9/36*   (2006.01)

(52) U.S. Cl. .............. 370/468; 370/229; 370/328; 370/412; 709/231

(58) Field of Classification Search ........... 370/468, 370/352, 412–418, 310–310.2, 328, 338, 370/395.21, 395.42; 709/231, 250
See application file for complete search history.

(56) References Cited

U.S. PATENT DOCUMENTS

| | | | |
|---|---|---|---|
| 6,269,078 B1 * | 7/2001 | Lakshman et al. ......... | 370/230 |
| 6,967,921 B1 * | 11/2005 | Levy et al. ............... | 370/230.1 |
| 2002/0054578 A1 * | 5/2002 | Zhang et al. ............ | 370/328 |
| 2002/0114292 A1 * | 8/2002 | Kawabata et al. ........ | 370/329 |
| 2002/0154656 A1 * | 10/2002 | Kitchin .................... | 370/468 |
| 2003/0235196 A1 * | 12/2003 | Balachandran et al. ... | 370/392 |
| 2003/0235208 A1 * | 12/2003 | Sahinoglu ................ | 370/468 |
| 2003/0236904 A1 * | 12/2003 | Walpole et al. .......... | 709/231 |
| 2004/0105393 A1 * | 6/2004 | Ronneke et al. ......... | 370/252 |

OTHER PUBLICATIONS

Technical Specification Group Services and System Aspects (3GPP), "Qos Concept and Architecture (Release 4)" Mar. 2002, 3GPP TS 23.107 V.4.4.0.*

* cited by examiner

*Primary Examiner*—Seema S. Rao
*Assistant Examiner*—Robert C. Scheibel, Jr.
(74) *Attorney, Agent, or Firm*—Joseph J. Laks; Robert B. Levy; Joseph J. Kolodka

(57) ABSTRACT

An apparatus in a wireless network includes a video encoder for encoding uncompressed video information into packets with variable length of compressed frames, and a decision processor for selecting a partial bandwidth and queuing delay on a wireless channel for each of the packets based on an intended reception quality. Preferably, the queuing delay and partial bandwidth are one of a plurality of distinct queuing delay and partial bandwidth representative of wireless transmission quality of service classes.

10 Claims, 3 Drawing Sheets

VIDEO PACKETS OVER A WIRELESS LINK UNDER VARYING DELAY AND BANDWIDTH CONDITIONS

BACKGROUND

1. Technical Field

The invention pertains to wireless communications and, more particularly to optimally sending video packets over a wireless link under varying bandwidth based on video quality demands.

2. Description of the Related Art

A universal mobile telecommunications network 10 of FIG. 1 includes a wireless link between mobile devices 11 and a cellular radio tower 12 indicated as node B. A home location register HLR 18 is accessible by a mobile switching center MSC 17 tied to a public switched telephone network PTSN 19. A landline communication network includes a Radio Network Controller RNC 13 tied to a Serving General Packet Radio Service Support Node, SGSN 14. The node SGSN 14 is tied to the Mobile Switching Center 17 and a Gateway General Packet Radio Service Support node, GGSN 15. An Internet/packet data network PDN 16 is linked to the gateway node, GGSN 15.

Referring to the diagram 20 of FIG. 2, a number of uncompressed video frames 22, indicated as f1, f2, f3, f4 and f5, are shown that have a fixed size in number of bytes. After video compression by a video encoder 21, the number of bytes required to code each video frame is variable to achieve the constant video quality across video frames, which results in a variable bit rate VBR 23 stream of packets p1, p2, p3, p4 and p5 with variable length of compressed video.

Delivering a variable bit rate (VBR) compressed video stream over a wireless network or link requires network resource allocation. Delivering a variable bit rate (VBR) video stream with variable frame sizes over a wireless mobile network requires appropriate network resource allocation for each frame to maximize the network efficiency, minimize the delivery jitter (frame arrival variation), and smooth the traffic flow over the wireless network.

Current video delivery application maps a video stream into one quality of service QoS queue without any adaptation. For a variable bit rate VBR video stream, a fixed quality of service QoS queue for all frames with variable sizes is not an optimal solution.

Accordingly, there is a need to optimally send variable length video packets over a wireless link.

SUMMARY OF THE INVENTION

The present invention optimally sends video packets of variable length or variable bit rate over a wireless communication link.

A computer readable medium containing instructions that, when executed by a processor in a communication network, performs the steps of receiving packets of variable length of compressed video information; and determining a queuing delay and partial bandwidth from a total bandwidth available on a wireless channel for each of the packets for transmitting the packets over the wireless channel, the queuing delay and partial bandwidth for each of the packets being based on criteria for reception quality at a receiving location on the wireless channel. Preferably, the partial bandwidth is one of a plurality of distinct queuing delay and partial bandwidths representative of wireless transmission quality of service classes and the plurality of distinct queuing delay and partial bandwidth are representative of four quality of service classes: conversational, streaming, interactive and background. Preferably, the criteria includes at least one of a maximum bandwidth (kbps), a guaranteed bit rate (kbps), a delivery order, a maximum service data unit SDU size (octets), service data unit SDU format information (bits), a service data unit SDU error ratio, a residual bit error ratio, a delivery of erroneous service data units SDUs, a transfer delay (ms), a traffic handling priority, and an allocation/retention priority.

In another aspect of the invention, an apparatus in a wireless network includes a video encoder for encoding uncompressed video information into packets with variable length of compressed frames, and a decision processor for selecting an appropriate QoS class associated with a partial bandwidth on a wireless channel for each of the packets based on an intended reception quality.

In a further aspect of the invention, a method for optimal bandwidth allocation for wireless transmission of video information, the method comprising the steps of converting video information into packets with variable length of bits; and allocating a bandwidth on a wireless channel for each one of the packets, the bandwidth being associated with criteria for reception quality of the packets over the wireless channel.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

This invention addresses the mapping of a variable bit rate VBR video stream into four Quality of service (QoS) classes specified in the 3GPP's Universal Mobile Telecommunications System (UMTS) specification in order to maximize the network efficiency, minimize the delivery jitter (frame arrival variation), and smooth the traffic flow over the wireless network. The mapping is determined by optimizing an objective function, which achieves the frame constant delay objective. By mapping frames with a large frame size onto a higher quality of service QoS class in a wireless network and the frames with a smaller frames size on a lower quality of service QoS class provides a simple stateless queuing scheduling mechanism to balance load cross quality of service QoS classes to achieve a high call admission rate and low video quality distortion. In addition, traffic carried in lower quality of service QoS class costs less than that in higher quality of service QoS class. This invention provides users with a balanced cost versus a quality scheme to tailor users requirements and expectations of a video delivery application over a wireless network.

Typically, video frame types have the following order in frame sizes: I, P, B. Usually, the frame size of an I frame is much greater than that of the P and B frames. Therefore, this invention spontaneously maps I frames into a higher quality of service QoS class and P and B frames into a lower quality of service QoS class. From a scalable video compression point of view, I frames can be considered as a base sublayer with highest priority, and P and B frames as enhancement sublayers with lower priority. Therefore, this invention automatically implements the idea of mapping a scalable video into different quality of service QoS classes.

Figure 3:
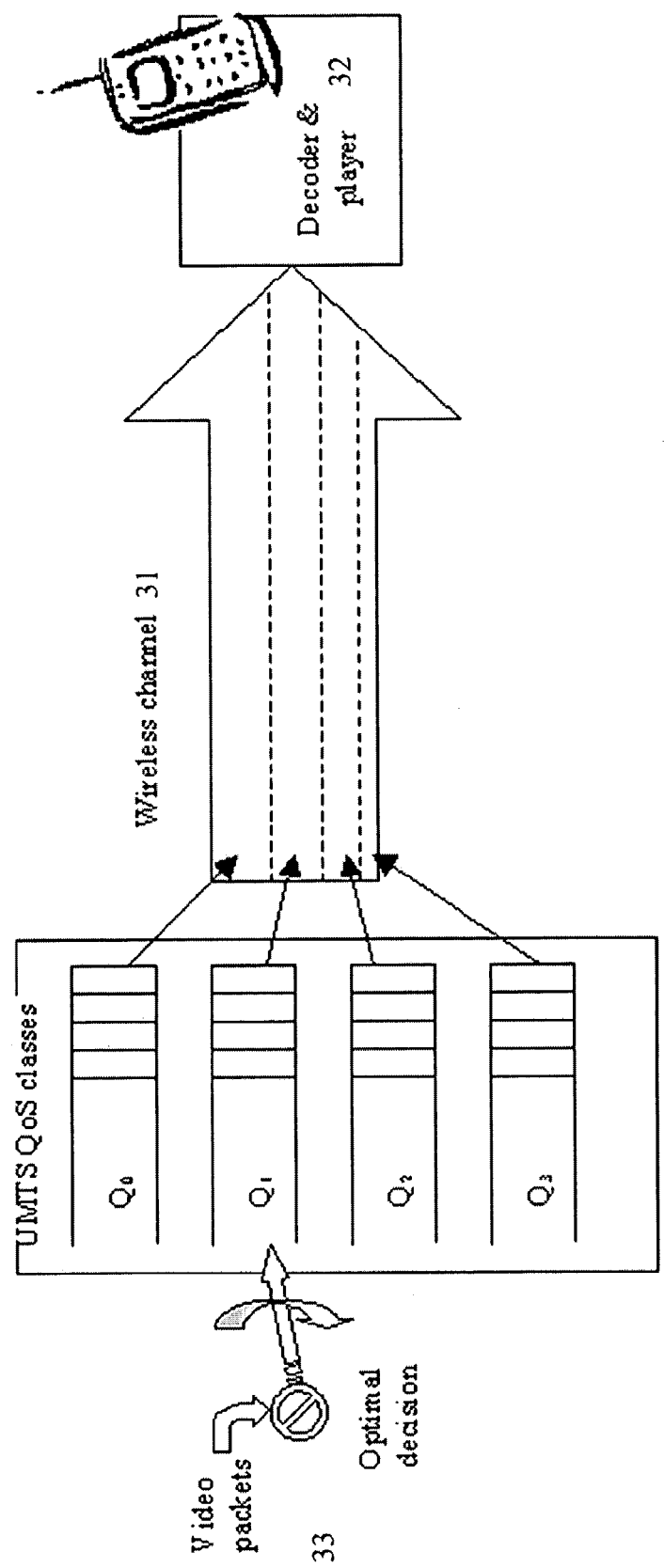
FIG. 3 is a diagram of variable bit rate video packets optimally routed across a wireless channel according to multiple classes of quality of service QoS in accordance with the invention.

An inventive wireless communication system 30 with multiple quality of service QoS classes Q0, Q1, Q2, Q3 is shown in FIG. 3. Video packets composed of variable frame lengths are selectively transmitted across bandwidths available in a wireless channel 31. Each quality of service class associates a queue Q0–Q3 with different quality of service QoS parameters required at the receiving end 32 of the wireless channel 31. Quality of service parameters QoS such as bandwidth, delay time, jitter, etc., place different transmission bandwidth demands on the wireless transmission link 31. As shown in 30, quality of service class or queue Q0 provides greater transmission bandwidth at a relatively higher cost in the wireless channel 31 than quality of service Q3. Consequently, the video delivered at the receiving end 32 for a transmission over quality of service class Q0 costs higher than the video delivered with a transmission over quality of service class Q3. The variable bit rate packets are routed into different quality of service classes or queues Q0–Q3 based on an optimal decision taking into account bandwidth availability and video quality factors such as delay time and jitter.

In a 3G mobile network, four quality of service QoS classes are specified: Conversational, Streaming, Interactive and Background. By mapping video frames with different sizes into more than one mobile network quality of service QoS classes, we are able to achieve those goals.

In a video, not all the frames are created equal. Some frames are more dynamic than the others. For example, a sport video with lots of motions and video with a scene change in the middle of a video recording require much more number of bits to encode and more bandwidth to deliver. A video is digitally compressed into a series of frames with variable sizes (number of bytes) to maximize the overall video quality. Using a network with fixed Quality of service QoS (throughput, delay time, jitter requirements) is not economical. In a 3G universal mobile telecommunication system UMTS wireless network, 3GPP standard body specified four different quality of service QoS classes: Conversational (quality of service QoS class 0), Streaming (quality of service QoS class 1), Interactive (quality of service QoS class 2) and Background (quality of service QoS class 3). Each class has its own range of quality of service QoS parameters. 3GPP specifies the following parameters for those four quality of service QoS classes: maximum bandwidth (kbps), guaranteed bit rate (kbps), delivery order, maximum service data unit SDU size (octets), SDU format information (bits), SDU error ratio, residual bit error ratio, delivery of erroneous SDUs, transfer delay (ms), traffic handling priority, allocation/retention priority.

Suppose a video stream consists of a series of frames, $$F=\{f_0, f_1, \ldots, f_n\}$$

and each frame has the size in number of bits, $$B=\{b_0, b_1, \ldots, b_n\}$$

In a universal mobile telecommunication UMTS network 10, four data queues are allocated to support four quality of service QoS classes for each user. At time t, we assume the estimated available bandwidth for each queue is available:

$$C(t)=\{c_0(t),c_1(t),c_2(t),c_3(t)\}$$

and the average queuing delay time for each queue is known as well:

$$D(t)=\{d_0(t),d_1(t),d_2(t),d_3(t)\}$$

At the same time t, a frame $f_i$ (i=0, 1, 2, ..., n) with frame size $b_i$ (i=0, 1, 2, ..., n) moves to the beginning of the transmission buffer. The time it takes to transmit the frame from the transmitter to a receiver with one hop through one of the four quality of service QoS queue is $$T_k^i = d_k(t) + b_i/c_k(t) \quad i=0, 1, \ldots, n \; k=0,1,2,3 \rightarrow \quad \text{Equation (1)}$$

The first term is the queuing delay and the second term is network transmission delay. The end-to-end delay requirement, $\Delta T$, of a video stream is one of the video qualities the underlying network must guarantee. The variation of the delay from frame-to-frame is known as jitter. A video stream delivered without jitter (jitter=0) meets the constant delay requirement, i.e.

$$\Delta T = \text{const}$$

Figure 1:
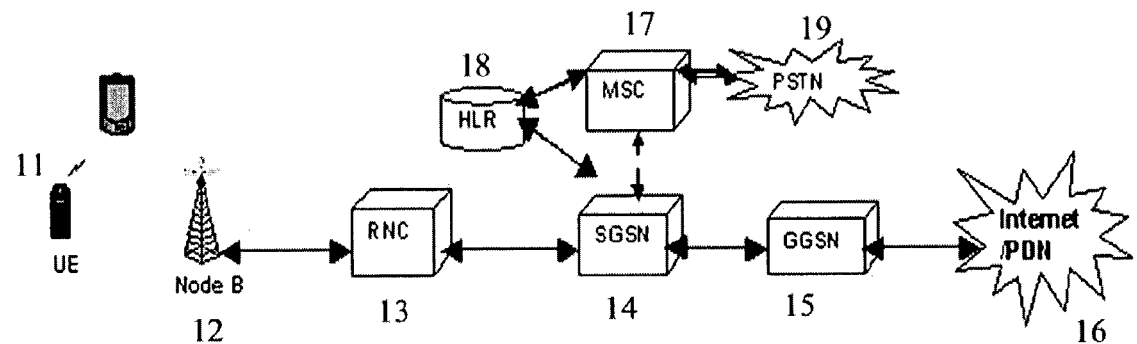
FIG. 1 is a system block diagram of a Universal Mobile Telecommunications System UMTS.
Figure 4:
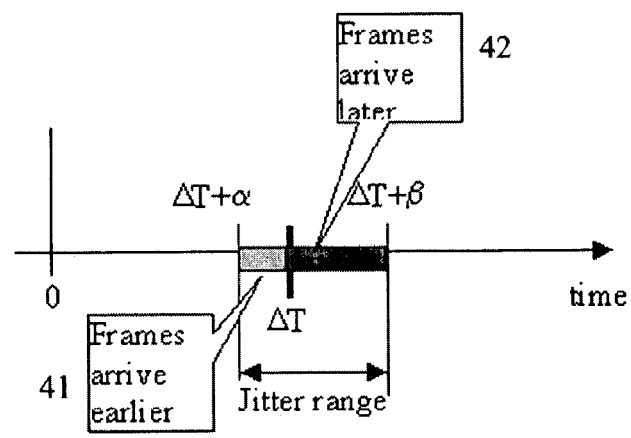
FIG. 4 is a diagram illustrating mathematical principles for optimal minimum variation of delay from frame-to-frame in video delivery.
Figure 2:
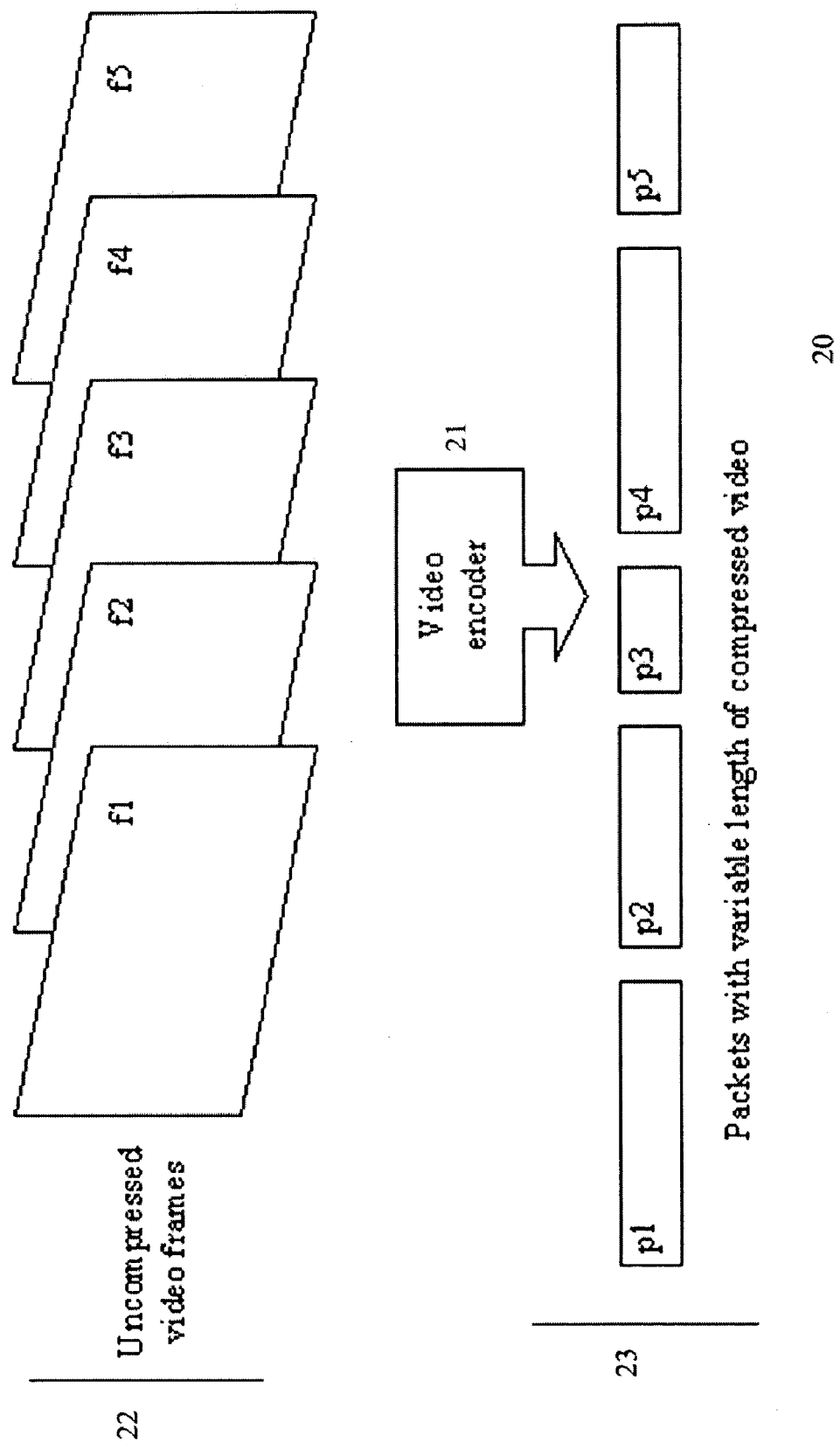
FIG. 2 is a diagram of encoding uncompressed video frames of fixed bit size into packets with variable length of bits compressed video.

However, jitter is inevitable in a video delivery network. Therefore, we define the following objective function and optimize it in order to minimize the jitter, and therefore to keep the delay time as constant as possible.

$$\underset{k}{\text{Min}} \left| d_k(t) + \frac{b_i}{c_k(t)} - \Delta T \right| \quad k = 0, 1, 2, 3 \qquad \text{Equation (2)}$$

$$\text{subject to } \alpha \leq d_k(t) + \frac{b_i}{c_k(t)} - \Delta T \leq \beta \qquad \text{Equation (3)}$$

where $\alpha$ and $\beta$ are constants and determine the range of jitter. This constraint says the delivery time cannot be earlier than $\alpha$ sec and later than $\beta$ sec using $\Delta T$ as a reference. If every frame must be delivered within $\Delta T$ sec, $\beta$ must be equal to zero. This is illustrated in the graph 40 of FIG. 4, showing jitter range varying between frames arriving earlier 41 and frames arriving later 42.

In other words, we search for all the four quality of service QoS classes to find the one with the lowest available bandwidth quality of service QoS that still meets the delay requirement.

Here is an example to illustrate the algorithm proposed above. Suppose the $i^{th}$ frame is transmitted such that the end-to-end delay constraint $\Delta T$ is 10 ms. Let the time it takes to transmit the frame from the transmitter to a receiver with one hop through the four Quality of service QoS queues is $$T_k^i = d_k(t) + b_i/c_k(t) \quad i=0, 1, \ldots, n \; k=0, 1, 2, 3$$

Suppose
  $T_0^i = 5$ ms
  $T_1^i = 8$ ms
  $T_2^i = 11$ ms
  $T_3^i = 15$ ms
  $\alpha = -1$ ms
  $\beta = 2$ ms Defining, $$\Omega = d_k(t) + \frac{b_i}{c_k(t)} - \Delta T \qquad k = 0, 1, 2, 3$$

and using Equation 2
For QoS 0, $|\Omega|$ is $|5-10|=5$
For QoS 1, $|\Omega|$ is $|8-10|=2$
For QoS 2, $|\Omega|$ is $|11-10|=1$
For QoS 3, $|\Omega|$ is $|15-10|=5$ Using Equation 3 giving the constraint that $\alpha \leq \Omega \leq \beta$, where $\alpha=-1$ ms and $\beta=2$ ms, we see that Quality of service QoS 2 should be chosen to send the frame as per the above algorithm to achieve the best cost-effective objective even QoS 0 and QoS 1 provides higher bandwidth.

The inventive of mapping a variable bit rate VBR video stream into the four quality of service QoS classes has three major advantages over a traditional approach: It optimizes the utilization of the quality of service QoS resources in a UMTS system in an optimized efficient manner. Using a lower permissible bandwidth quality of service QoS class has economical benefit for both operators and users.

The objective function is optimized (minimized) for jitter variation. Near constant delay requirement can be achieved. By achieving the near constant delay requirement is equivalent to a traffic shaping function from the network point of view. This reduces the burst characteristics of delivering a video stream over a network.

Having described an exemplary mobile telecommunications system employing the inventive optimal transmission of variable length packets over a wireless link (which is intended to be illustrative and not limiting), it is noted that modifications and variations can be made by persons skilled in the art in light of the above teachings, for instance, a Hiperlan II wireless LAN (WLAN) with QoS provisioning. It is therefore to be understood that changes may be made in the particular embodiment of the invention disclosed which are within the scope and spirit of the invention as outlined by the appended claims.

What is claimed is:

1. An apparatus in a wireless network comprising:
   a video encoder for encoding uncompressed video information into packets with variable length of compressed frames; and
   a decision processor for selecting a QoS class associated with a partial bandwidth on a wireless channel for each of said packets based on an intended reception quality, wherein said decision processor selects the QoS class for each of said packets based upon an objective function that is optimized to achieve a frame constant delay objective that minimizes delivery jitter, wherein the objective function specifies the partial bandwidth and a queuing delay for each of said packets that is based on said intended reception quality.

2. Apparatus in claim 1, wherein said objective function comprises at least one of a maximum bandwidth (kbps), a guaranteed bit rate (kbps), a delivery order, a maximum service data unit SDU size (octets), service data unit SDU format information (bits), a service data unit SDU error ratio, a residual bit error ratio, a delivery of erroneous service data units SDUs, a transfer delay (ms), a traffic handling priority, and an allocation/retention priority.

3. The apparatus as recited in claim 1, wherein said partial bandwidth is one of a plurality of distinct partial bandwidth for third generation wireless quality of service classes.

4. The apparatus as recited in claim 3, wherein said plurality of distinct partial bandwidth are representative of four quality of service classes conversational, streaming, interactive and background.

5. The apparatus as recited in claim 1, wherein said partial bandwidth is one of a plurality of distinct partial bandwidth selectable from said total bandwidth, each of said distinct partial bandwidth being associated with a distinct said intended reception quality.

6. The apparatus as recited in claim 5, wherein said plurality of distinct partial bandwidth are four distinct bandwidths.

7. The apparatus as recited in claim 6, wherein each of said four distinct bandwidths is associated with a distinct one of four quality of service classes associated with a distinct said intended reception quality.

8. The apparatus as recited in claim 7, wherein said four quality of service classes comprise third generation (3G) quality of service classes: conversational, streaming, interactive and background.

9. The apparatus as recited in claim 1, wherein said intended reception quailty comprises at least one of a maximum bandwidth (kbps), a guaranteed bit rate (kbps), a delivery order, a maximum service data unit SDU size (Octets), service data unit SDU format information (bits), a service data unit SDU error ratio, a residual bit error ratio, a delivery of erroneous service data units SDUs, a transfer delay (ins), a traffic handling priority, and an allocation/retention priority.

10. The apparatus as recited in claim 1, wherein said encoding comprises encoding said video information as uncompressed video frames of equal bits into packets with variable length of compressed video.

* * * * *